US008406807B2

(12) United States Patent
Noh et al.

(10) Patent No.: US 8,406,807 B2
(45) Date of Patent: Mar. 26, 2013

(54) SYSTEM AND METHOD FOR PROVIDING MULTI-SCREEN SERVICE OF MOBILE TERMINAL

(75) Inventors: Kyoung-Lae Noh, Suwon-si (KR); Hyun-Sik Kim, Seongnam-si (KR); In-Ho Park, Seoul (KR); Giu-Yeol Kim, Suwon-si (KR); Jin-Sae Jung, Seoul (KR); Dong-Yun Shin, Seongnam-si (KR); Du-Seok Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 89 days.

(21) Appl. No.: 12/831,649

(22) Filed: Jul. 7, 2010

(65) Prior Publication Data

US 2011/0009166 A1 Jan. 13, 2011

(30) Foreign Application Priority Data

Jul. 7, 2009 (KR) ......................... 10-2009-0061504

(51) Int. Cl.
H04W 88/02 (2009.01)
(52) U.S. Cl. .................... 455/557; 455/426.1; 455/556.1
(58) Field of Classification Search .................. 455/557, 455/556.1, 566, 575.1, 426.1, 158.42, 418–420
See application file for complete search history.

(56) References Cited

U.S. PATENT DOCUMENTS

| 7,209,729 | B2* | 4/2007 | Oyagi et al. | 455/404.1 |
|---|---|---|---|---|
| 7,330,737 | B2* | 2/2008 | Mahini | 455/557 |
| 7,477,919 | B2* | 1/2009 | Warren | 455/557 |
| 7,486,972 | B2* | 2/2009 | Kouno | 455/569.2 |
| 2005/0064860 | A1* | 3/2005 | DeLine | 455/420 |
| 2005/0202810 | A1* | 9/2005 | LaPallo | 455/426.1 |
| 2007/0146476 | A1* | 6/2007 | Son | 348/14.01 |
| 2009/0075693 | A1* | 3/2009 | So et al. | 455/556.1 |

* cited by examiner

Primary Examiner — Cong Tran
(74) Attorney, Agent, or Firm — The Farrell Law Firm, P.C.

(57) ABSTRACT

Disclosed is a method for providing multi-screen service of a mobile terminal, the method including requesting and obtaining information on a second display device if the mobile terminal is connected with a cradling stand; activating a predetermined wireless communication interface and searching for a peripheral device using a network manager so as to connect the mobile terminal with the peripheral device; if the multifunctional remote control device is found and is connected with the mobile terminal, managing linkage between the mobile terminal and the multifunctional remote control device using an interaction manager; and if a service request signal is received from the multifunctional remote control device for the mobile terminal, changing screen information of the mobile terminal in accordance with characteristics of the second display device using a display manager and displaying the changed screen information on a display unit of the second display device.

15 Claims, 6 Drawing Sheets

SYSTEM AND METHOD FOR PROVIDING MULTI-SCREEN SERVICE OF MOBILE TERMINAL

PRIORITY

This application claims priority under 35 U.S.C. §119(a) to a Korean Patent Application entitled "System and Method for Providing Multi-Screen Service of Mobile Terminal" filed in the Korean Industrial Property Office on Jul. 7, 2009 and assigned Serial No. 10-2009-0061504, the contents of which are incorporated herein by reference.

BACKGROUND OF THE INVENTION

1. Field of the Invention

The present invention relates to the control of a mobile terminal, and more particularly to a system and method for providing multi-screen service of a mobile terminal according to convenience of a user.

2. Description of the Related Art

According to the development of various technologies, such as a wired or a wireless communication technology, multimedia technology, technology for manufacturing hardware including a CPU and a memory, and power charging technology, a mobile terminal has been constructed to be compact and highly efficient. The development of technologies for the mobile terminal facilitates the constant release of new-conceptual products, such as a smart phone, a netbook, a Mobile Internet Device (MID), an Ultra Mobile PC (UMPC), as well as new improvements to existing products including a Personal Digital Assistant (PDA) and a laptop. Through the development of various technologies, it is possible to entirely or partially apply the functions that could be used only in the conventional desktop PC to the mobile terminal thus blurring the boundary between the mobile terminal and the desktop PC.

FIG. 1 is a diagram illustrating the conventional functions used in the mobile terminal. As illustrated in FIG. 1, the mobile terminal provides various additional functions for providing the user with enjoyment and convenience, as well as a function of the simple voice call. FIG. 1 describes the functions, such as Internet search, multimedia reproduction, communication with an external device and network, utilization of graphic contents including games, and text edition, as an example. However, the mobile terminal of FIG. 1 can perform a variety of functions in addition to the above functions. Those functions can be selectively determined as the additional functions and applied to the mobile terminal according to a screen size, resolution, an input scheme, power consumption, an operation function.

However, the functions for providing the user with enjoyment and convenience are actually implemented in the mobile terminal, such as a smart phone or PDA, having a limited size. Therefore, if those functions are actually utilized by using the mobile terminal, the mobile terminal is subject to various limitations. For example, a size of a display unit of the mobile terminal is limited so that there is the inconvenience for visually displaying Internet browsing or content, such as a moving image, and there is difficulty in editing text due to a limited input unit. Further, a battery capacity of the mobile terminal is limited so that it is impossible to use those functions for a long time. In addition, there is only limited compatibility with an external device, such as a PC. Further, the small mobile terminal is preferable for the portability of the mobile terminal, but the large mobile terminal is preferable for the display unit and the compatibility with the external device for the convenience of the user.

SUMMARY OF THE INVENTION

Accordingly, the present invention has been made to solve at least the above-stated problems occurring in the prior art, and the present invention provides a method for easily and conveniently using various services, which have difficulties to be enjoyed in a small screen of the mobile terminal, to solve a usage problem according to a screen size, and for providing the user with convenience through wired and/or wireless connections with peripheral devices.

In accordance with an aspect of the present invention, there is provided a system for providing multi-screen service of a mobile terminal, the system including a mobile terminal for interacting with another device, the mobile terminal being connected with another device according to a communication state and a network connection condition; a cradling stand for transmitting screen information received from the mobile terminal if the mobile terminal is connected with the cradling stand; a second display device for displaying the screen information of the mobile terminal received through the cradling stand on a display unit of the second display device; and a multifunctional remote control device for controlling a basic function and an additional function of the mobile terminal and controlling a function of another device connected with the multifunctional remote control device or the mobile terminal.

In accordance with another aspect of the present invention, there is provided a method for providing multi-screen service of a mobile terminal, the method including requesting and obtaining information on a second display device if the mobile terminal is connected with a cradling stand; activating a predetermined wireless communication interface and searching for a peripheral device using a network manager so as to connect the mobile terminal with the peripheral device; if the multifunctional remote control device is found and is connected with the mobile terminal, managing linkage between the mobile terminal and the multifunctional remote control device using an interaction manager; and if a service request signal is received from the multifunctional remote control device to the mobile terminal, changing unique screen information of the mobile terminal in accordance with a characteristic of the second display device using a display manager and displaying the changed screen information on a display unit of the second display device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PRESENT INVENTION

Hereinafter, the embodiments of the present invention will be described with reference to the accompanying drawings. Further, various specific definitions found in the following description, such as specific constructional element, etc., are provided only to help general understanding of the present invention and those skilled in the art will appreciate that various modifications, additions and substitutions are possible, without departing from the scope and spirit of the invention as disclosed in the accompanying claims.

The present invention relates to a multi-functional remote control device for remotely controlling a mobile terminal and provide basic controls for functions of the mobile terminal. A service environment including a multi-functional remote control device as a constructional element will be described below.

Figure 1:
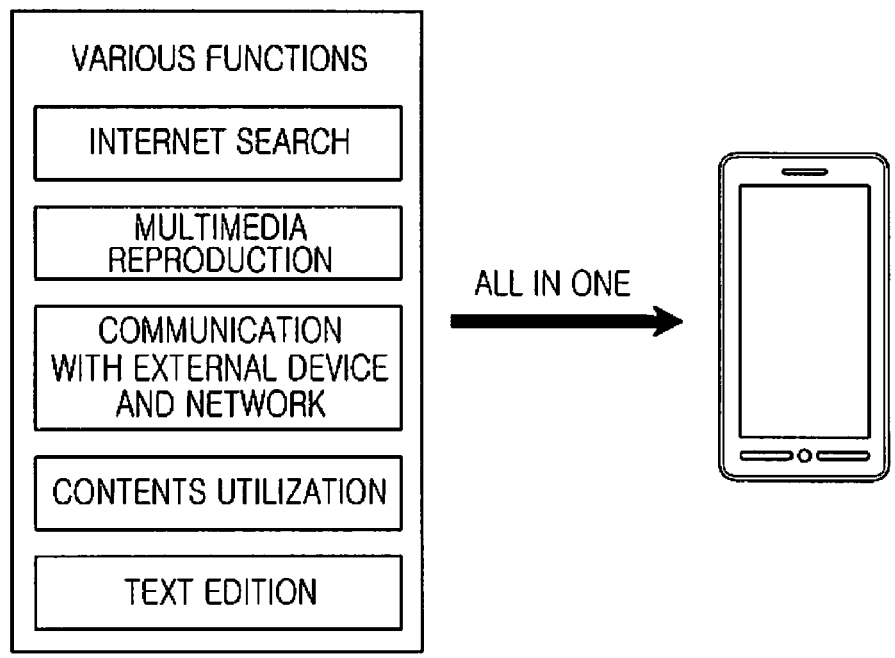
FIG. 1 is a diagram illustrating the conventional functions used in a mobile terminal.
Figure 2:
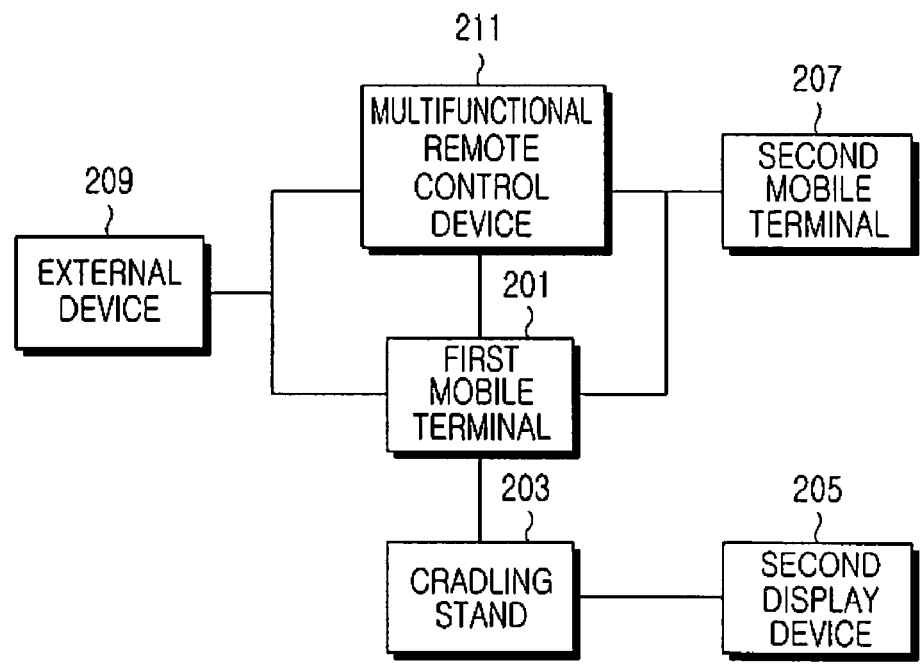
FIG. 2 is a diagram illustrating a service environment controlling a mobile terminal and other device connected with the mobile terminal using a multi-functional remote control device according to an embodiment of the present invention.

FIG. 2 is a diagram illustrating a service environment controlling the mobile terminal and another device connected with the mobile terminal using a multi-functional remote control device according to an embodiment of the present invention. The service environment in FIG. 2 basically includes a first mobile terminal 201, a cradling stand 203, a second display device 205, a second mobile terminal 207, an external device 209, and a multi-functional remote control device 211.

Referring to FIG. 2, the first mobile terminal 201 refers to a device serving as a center in a multi-screen convergence environment, and can be, for example, a mobile portable terminal, such as a smart phone or PDA. If each of the shown devices is connected with each other centering on the first mobile terminal 201, and the first mobile terminal 201 is connected with the multi-functional remote control device 211, a core function and additional function of the first mobile terminal 201 can be controlled by the multi-functional remote control device 211. The second display device 205 can be, for example, a digital TV, a monitor of a PC, or a projector, that is connected with the first mobile terminal 201 for conveniently using a function of the first mobile terminal 201 through a large screen. The second display device 205 displays content of the first mobile terminal 201 as is or can display the content after converting a user interface or resolution to be appropriate for a corresponding screen.

The cradling stand 203 connects the first mobile terminal 201 with the second display device, such as a digital TV or a monitor of a PC, and is also used for charging the first mobile terminal 201. The second mobile terminal 207 refers to another mobile terminal that can be connected with the first mobile terminal 201 or the multi-functional remote control device 211, via a wired or wireless connection. Further, the second mobile terminal 208 can be connected with the first mobile terminal 201 or multi-functional remote control device 211 for the purpose of information sharing, such as sharing a file, and multi-party communication, such as call waiting and switching, or the like. The external device refers to any connectable device, except for the second display device 205 and the second mobile terminal 207, which includes, for example, a PC or Voice over Internet Protocol (VoIP) device.

The multi-functional remote control device 211 remotely controls a core function and additional functions of the first mobile terminal 201 and the remote control can be enabled when the first mobile terminal 201 is connected with the cradling stand 203. Further, the multi-functional remote control device 211 controls the second display device 205, the second mobile terminal 207, and the external device 209 that are directly or indirectly connected with the multi-functional remote control device 211.

Figure 3:
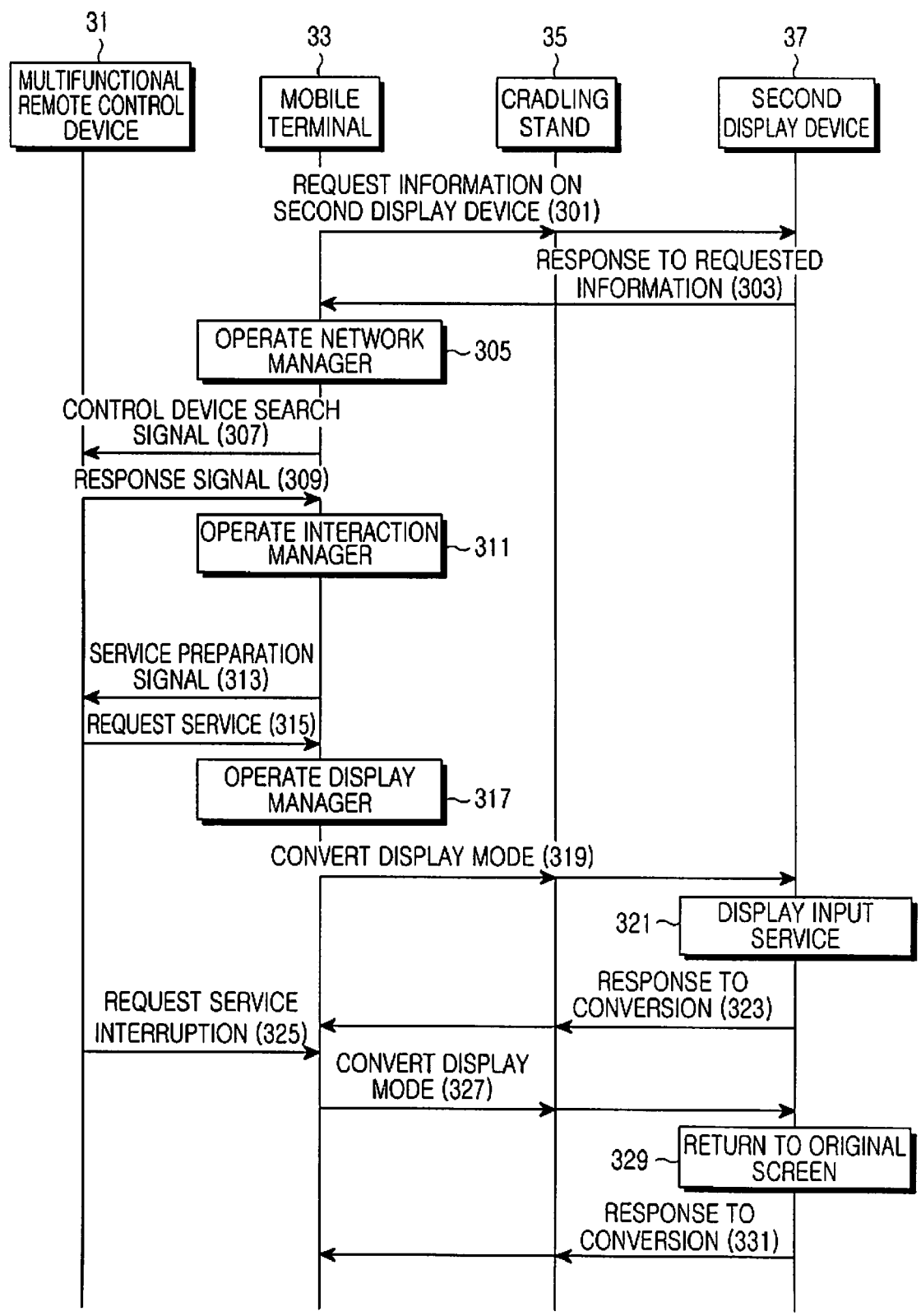
FIG. 3 is a flowchart illustrating a process of setting a multi-screen service environment according to an embodiment of the present invention.

FIG. 3 is a flowchart illustrating a process of setting the multi-screen service environment according to an embodiment of the present invention.

In step 301, if the mobile terminal 33 is connected with the cradling stand 35, the mobile terminal 33 requests through the cradling stand 35 information of the second display device 37 from the second display device 37 that is connected with the cradling stand 35. In step 303, the second display device 37 transmits through the cradling stand 35 a response to the requested information to the mobile terminal 33. If the connection between the mobile terminal 33 and the cradling stand 35 is recognized and the mobile terminal 33 receives the information of the second display device 37, an environment is set up to execute a multi-screen service and a network manager operates to connect between the mobile terminal 33 and a peripheral device in step 305. When the network manager operates, the mobile terminal 33 searches for the multi-functional remote control device 31 and a peripheral device in step 307. If the multifunctional remote control device 31 receives the search signal, the multifunctional remote control device 31 transmits to the mobile terminal 33 a response signal corresponding to the received signal and performs a connection process in step 309. The connection process is implemented by a previously determined method. If the multifunctional remote control device 31 is connected with the mobile terminal 33, an interaction manager for managing the connection between the devices operates in step 311. In such an operation of the interaction manager, an initial setting is started for activating all the functions including, but not limited to, a call receiving and sending function of the mobile terminal 33. If the initial setting is completed, the mobile terminal 33 transmits a service preparation signal, which is a preparation state in which the mobile terminal 33 can process a request for the multi-screen service to the multi-functional remote control device 31, in step 313.

If the multi-functional remote control device 31 requests from the mobile terminal 33 the service desired by a user in step 315, a display manager displays an operation and a function executed in the mobile terminal 33 on the second display device 37 in step 317. If the display manager operates, the mobile terminal 33 converts a display mode into a screen display mode in accordance with a characteristic of the second display device 37 using the received information of the second display device 37 and transmits the converted screen display mode through the cradling stand 35 in step 319. The second display device 37 receiving the converted screen display mode displays the corresponding operation and function of the mobile terminal 33 on a display unit of the second display device 37 in step 321. The second display device 37 transmits to the mobile terminal 33 a response corresponding to the converted screen display mode through the cradling stand 35 in step 323.

If the multifunctional remote control device 31 requests an interruption of the service provided to the mobile terminal 33 in step 325, the mobile terminal 33 transmits a general display mode to the second display device 37 through the cradling stand 35 in step 327. The second display device 37 receiving the general display mode returns to an original screen in step 329 and transmits a response to the general display mode to the mobile terminal 33 in step 331. If the cradling stand 35 is separated from the mobile terminal 33, the mobile terminal 33 automatically returns to the general display mode and the display in the second display device and a charging function is also terminated. Further, the connection with the multifunctional remote control device 31 and the exterior device that are connected with the mobile terminal is also terminated, and the setting of the wireless interface automatically returns to an existing initial state. That is, the mobile terminal 33 returns to the initial state where the mobile terminal 33 is not connected with the cradling stand 35. The services provided in the present invention include, but are not limited to, internet search, text work, media file reproduction, and contents utilization, such as game play, and the process for performing the above services can be displayed through the second display device.

Figure 4:
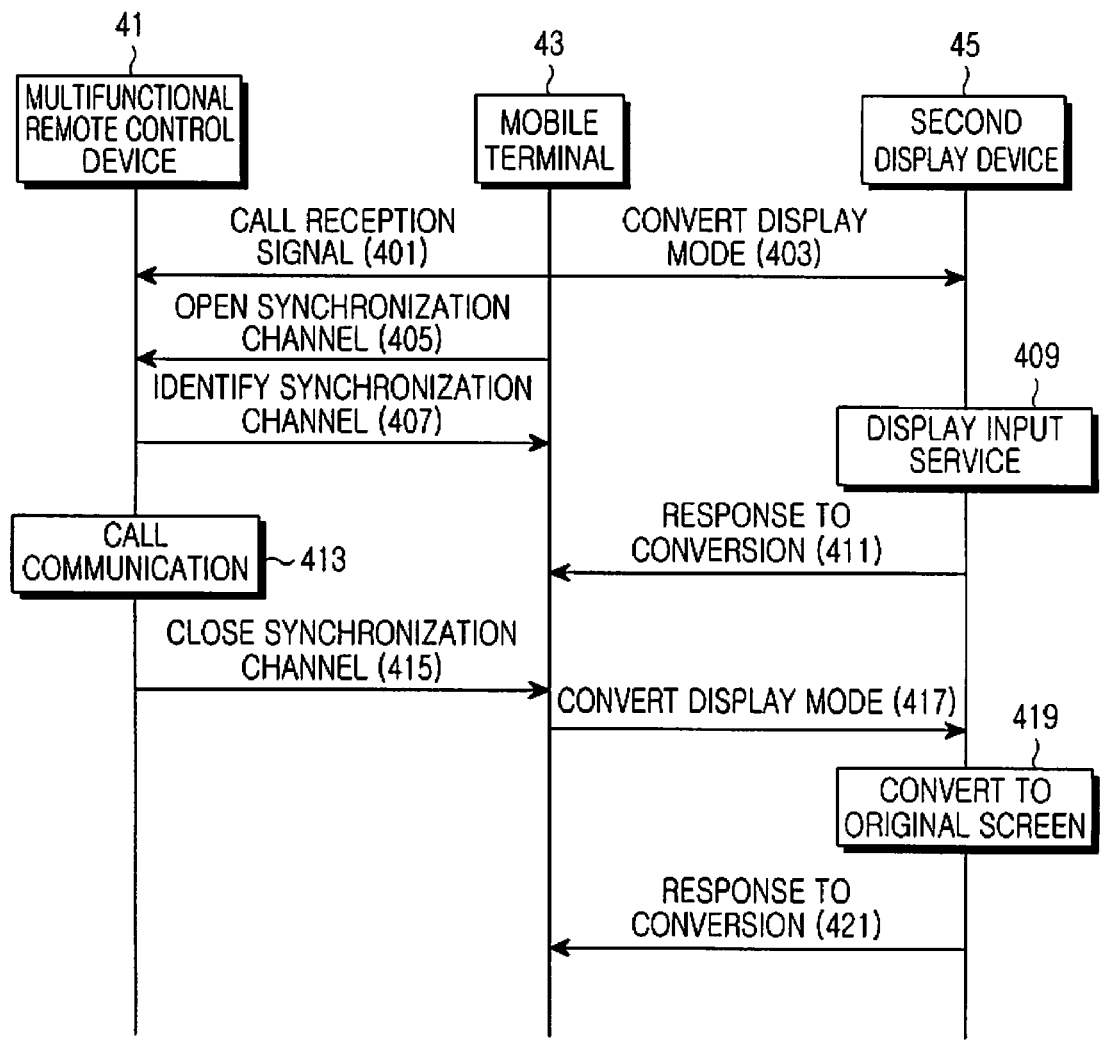
FIG. 4 is a flowchart illustrating a process of receiving a call in a multi-screen service according to an embodiment of the present invention.

FIG. 4 is a flowchart illustrating a process of receiving a call in the multi-screen service according to an embodiment of the present invention. Even though it is not illustrated in FIG. 4, the process of receiving the call is progressed in a state where the network manager, the interaction manager, and the display manager are operated.

If the mobile terminal 43 receives a call from the outside, the mobile terminal 32 transmits a signal notifying the multifunctional remote control device 41 of the reception of the call as soon as the mobile terminal 43 converts a screen representing the reception of the call in accordance with the characteristic of the second display device 45 and transmits the converted screen to the second display device 45 in step 401. The multifunctional remote control device 41 receiving the call reception signal assigns a synchronization channel for transferring a voice signal to the mobile terminal 32 in step 405. Further, the mobile terminal 32 assigns the synchronization channel by the multifunctional remote control device 41 in step 407. In order to notify the reception of the call through the first display device, information on the received call received from the mobile terminal 43 is displayed on a display unit of the second display device 45 in step 409. The second display device 45 transmits a response to the reception of the number information of the received call to the mobile terminal 43.

If the synchronization channel is assigned as described above, the multifunctional remote control device 41 performs a call communication instead of the mobile terminal 43. Information during the call, such as a video call, can be displayed on the display unit of the second display device 45.

If the call communication is terminated, the synchronization channel is released in step 415. If the synchronization channel with the multifunction remote control device 41 is released, the mobile terminal 43 converts the previously displayed display mode in accordance with the characteristic of the second display device 45 and transmits the converted display mode to the second display device 45 in step 417. The second display device 45 receives the converted display mode and returns to the initial screen in step 419, and transmits a response to the received display mode to the mobile terminal 43 in step 421.

Figure 5:
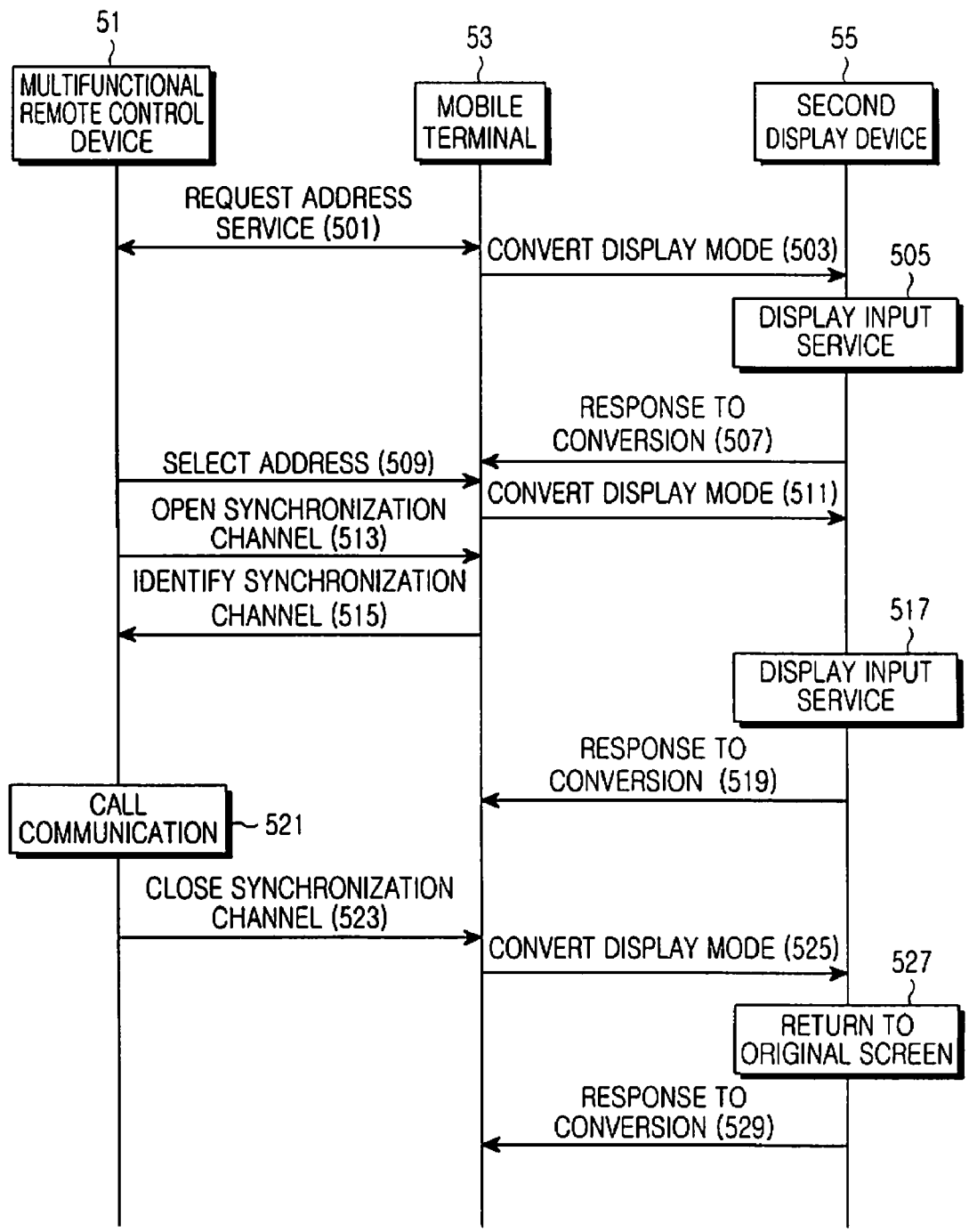
FIG. 5 is a flowchart illustrating a process of transmitting a call in a multi-screen service according to an embodiment of the present invention.

FIG. 5 is a flowchart illustrating a process of transmitting a call in a multi-screen service according to an embodiment of the present invention. Even though it is not illustrated in FIG. 5, as in FIG. 4, the process of transmitting the call is conducted in a state where the network manager, the interaction manager, and the display manager operate.

The multifunction remote control device 51 requests an address service desired by the mobile terminal 53 for transmitting the call communication in step 501. The mobile terminal 53 receiving the request of the address service converts the desired address information in accordance with the characteristic of the second display device 55 and transmits the converted address information to the second display device 55 in step 503. The second display device 55 receiving the converted address information displays the address information on the display unit of the second display device 55 in step 505, and transmits a response to the reception of the address information to the mobile terminal 53 in step 507.

The multifunction remote control device 51 selects an address through the address information displayed on the display unit of the second display device 55 in step 509, converts information representing the address selection, and transmits the converted information to the second display device 55 in step 511. The second display device 55 displays information on the address selection on a display unit in step 517. Further, the second display device 55 transmits a response to the information on the address selection to the mobile terminal 53 in step 519. The multifunction remote control device 51 assigns a synchronization channel with the mobile terminal 53 for transferring a voice call in step 513. The mobile terminal 53 also assigns the synchronization channel by the multifunction remote control device 51 in step 515. The multifunction remote control device 51 performs a call communication to a number corresponding to the selected address in step 521. Information during the call, such as a video call, can be displayed on the display unit of the second display device 55.

If the call communication is terminated, the synchronization channel is released in step 523. If the synchronization channel with the multifunction remote control device 51 is released, the mobile terminal 53 converts the previously displayed display mode in accordance with the characteristic of the second display device 55 and transmits the converted display mode to the second display device 55 in step 525. The second display device 55 receives the converted display mode and returns to the initial screen in step 527, and transmits a response to the received display mode to the mobile terminal 53 in step 529.

The function of receiving and sending the call communication of FIGS. 4 and 5 can be generated during the execution of another function in the mobile terminal. In this case, the function of the call communication is performed in a state in which the currently operating function of the mobile terminal is maintained as is or is temporarily interrupted, and if the function of the call communication is terminated, the temporarily interrupted function is re-executed.

Figure 6:
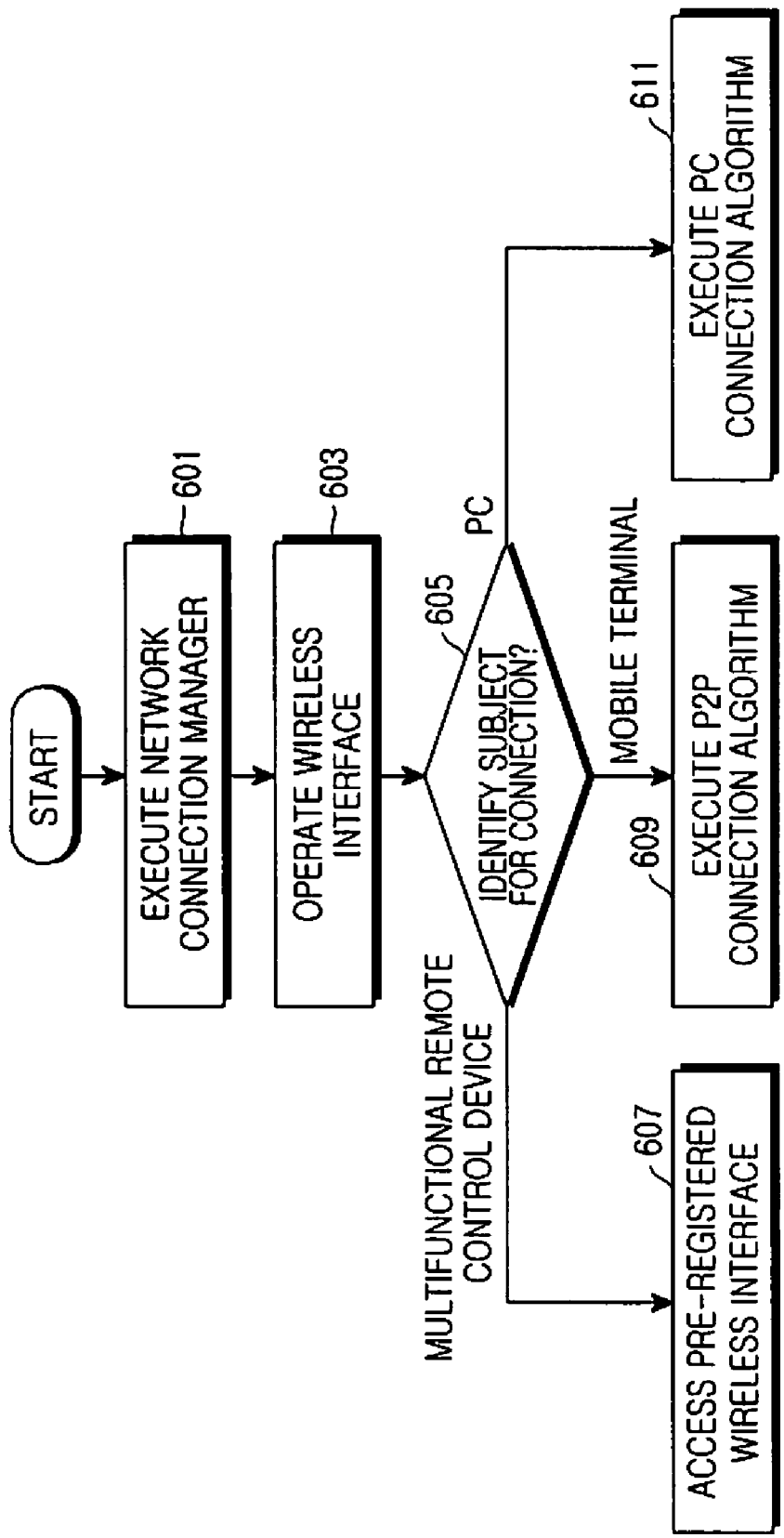
FIG. 6 is a flowchart illustrating a process of the operation of a network manager according to an embodiment of the present invention.

FIG. 6 is a flowchart illustrating a process of the operation of the network manager according to an embodiment of the present invention. First, the network manager is executed in step 601. The network manager manages all of the connectable wireless interfaces for collecting basic information on a communication state and a connection condition around the current mobile terminal in step 603. The network manager determines a subject for connection in step 605. If the subject for connection is the multifunctional remote control device, the network manager accesses the previously registered wireless interface in step 607. If the subject for connection is another mobile terminal, the network manager executes a Point-to-Point (P2P) connection algorithm to perform the network connection in step 609. If the subject for connection is a PC, the network manager executes a PC connection algorithm to perform the network connection in step 611.

Figure 7:
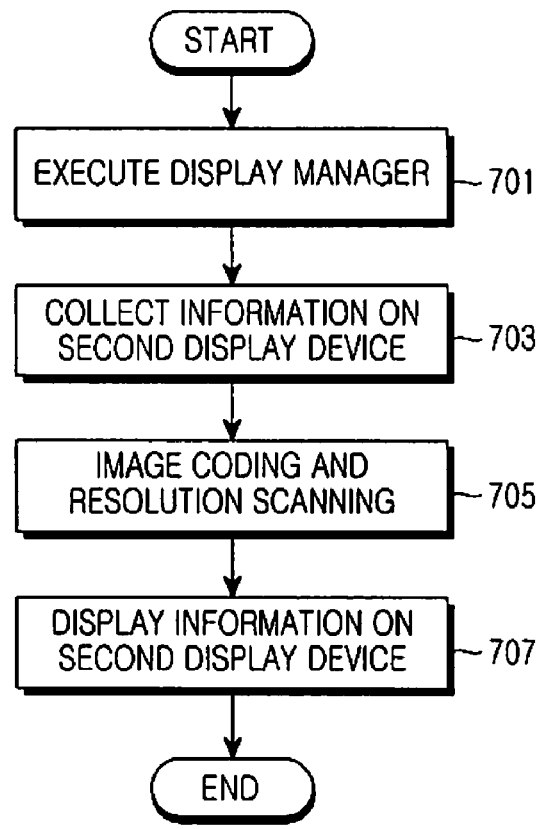
FIG. 7 is a flowchart illustrating a process of the operation of a display manager according to an embodiment of the present invention.

FIG. 7 is a flowchart illustrating a process for operating the display manager according to an embodiment of the present invention. The display manager is adapted for displaying a regular screen and an efficient and familiar user interface in a user aspect during the use of the service of the mobile terminal through the second display device connected with the cradling stand.

The display manager is executed in step 701. The display manager collects or renews basic information, such as resolution and a connection type, of the second display device and drives the user interface for displaying the collected or renewed basic information on the display unit of the second display device in accordance with a usage condition of the current mobile terminal in step 703. The display manager adjusts the user interface according to a standard of the display unit of the connected second display device in step 705. A method for supplying the user interface with the standard of the display unit includes coding a corresponding image or scanning the resolution. The display manager displays the user interface that has been supplied according to the standard of the display unit in step 707. At this time, the display unit of the mobile terminal can be turned off for saving power and the display unit of the second display device only can be used.

Figure 8:
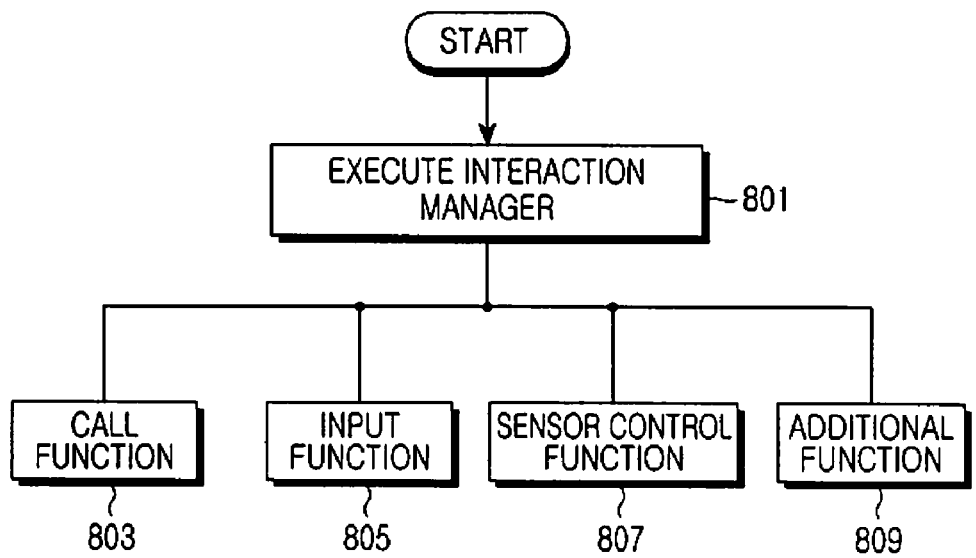
FIG. 8 is a flowchart illustrating a process of the operation of an interaction manager according to an embodiment of the present invention.

FIG. 8 is a flowchart illustrating a process of the operation of the interaction manager according to an embodiment of the present invention. The interaction manager is a manager for managing an operation between the mobile terminal and a remote controller.

The interaction manager is executed in step 801, to control the functions of the system. First, the interaction manager controls a call function in step 803. The call function refers to a function, such as receiving/sending a call, searching for a telephone number, and managing a message. The interaction manager controls an input function of the mobile terminal in step 805. The input function refers to a function of inputting content desired by the user using a pointing device, such as a wired and/or wireless keyboard and a mouse. Such an input function can complement the usage of the mobile terminal in which a space for inputting is greatly limited. The interaction manager also controls a sensor control function in step 807. The sensor control function refers to a function for recognizing movement, such as a location change, and controlling a game using the sensor. The interaction manager also controls an additional function in step 809. The additional function refers to various additional functions, such as a multiparty calling function and a call exchanging function, that can be provided based on a service platform. That is, a representative additional function is a function of a portable exchanger capable of controlling the mobile terminal of another family member, as well as the mobile terminal connected to the cradling stand so as to perform the call communication or providing the multiparty call service.

Accordingly, the system and method for remotely providing multi-screen service of the mobile terminal can control the functions of the mobile terminal and the peripheral devices, thereby allowing the user to control various devices without inconvenience, and can output the contents on a digital TV or a monitor of a PC, thereby allowing the user to conveniently use the functions, which are difficult to enjoy on a small screen.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A system for providing a multi-screen service of a mobile terminal, the system comprising:
    a mobile terminal;
    a cradling stand for accepting the mobile terminal and for transmitting screen information from the mobile terminal to an external display device while the mobile terminal is accepted by the cradling stand and is communicably connected with the cradling stand, such that the screen information is displayed on the external display device; and
    a remote control device for controlling the mobile terminal to transmit the screen information to the external display device through the cradling stand,
    wherein the mobile terminal, the cradling stand, and the remote control device are separated from one another, and the mobile terminal can be used as a portable phone to make a phone call, and
    wherein the screen information is directly transmitted from the mobile terminal to the external display device through the cradling stand, not through the remote control device.

2. The system as claimed in claim 1, wherein the screen information can be converted in accordance with a feature of a display screen of the external display device.

3. The system as claimed in claim 2, wherein the mobile terminal is equipped with a module supporting at least two types of wireless interfaces to perform communication.

4. The system as claimed in claim 1, wherein the mobile terminal changes a screen displayed on a display unit of the mobile terminal in accordance with characteristics of the external display device and transmits a signal corresponding to the changed screen to the external display device.

5. The system as claimed in claim 1, wherein the cradling stand charges the mobile terminal when the cradling stand is connected with the mobile terminal.

6. The system as claimed in claim 1, wherein the remote control device controls functions of the mobile terminal only when the mobile terminal is connected with the cradling stand.

7. The system as claimed in claim 1, further comprising an external device that is connected with the mobile terminal or the remote control device to provide various functions.

8. The system as claimed in claim 1, wherein the mobile terminal controls the cradling stand to transmit the screen information to the external display device.

9. A method for providing a multi-screen service of a mobile terminal, the method comprising:
    communicably connecting a mobile terminal with a cradling stand, the mobile terminal being accepted by the cradling stand;
    receiving an instruction from a remote control device to transmit screen information to an external display device; and
    transmitting, based on the instruction, the screen information to the external display device through the cradling stand in order for the screen information to be displayed on the external display device,
    wherein the mobile terminal, the cradling stand, and the remote control device are separated from one another, and
    wherein the screen information is directly transmitted from the mobile terminal to the external display device through the cradling stand, not through the remote control device.

10. The method as claimed in claim 9, wherein the mobile terminal is equipped with a module using at least two types of wireless interfaces to perform communication.

11. The method as claimed in claim 9, further comprising:
changing a screen displayed on a display unit of the mobile terminal in accordance with characteristics of the external display device; and
transmitting a signal corresponding to the changed screen to the external display device.

12. The method as claimed in claim 9, wherein the cradling stand charges the mobile terminal when the cradling stand is connected with the mobile terminal.

13. The method as claimed in claim 9, wherein the remote control device controls functions of the mobile terminal only when the mobile terminal is connected with the cradling stand.

14. The method as claimed in claim 9, wherein the mobile terminal or the remote control device is connected with an external device to provide various functions of the external device.

15. The method as claimed in claim 9, wherein transmitting the screen information to the external display device through the cradling stand comprises:

transmitting, by the mobile terminal, the screen information to the cradling stand; and transmitting, by the cradling stand, the screen information to the external display device.

* * * * *